Figure 1:
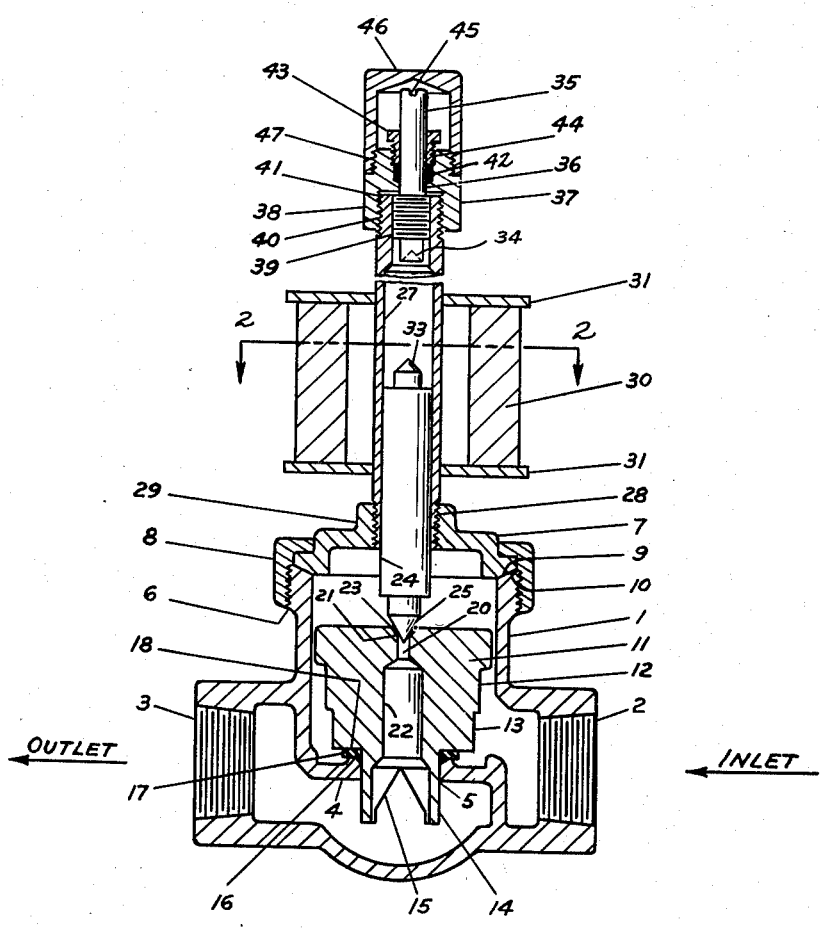

Feb. 24, 1953

W. G. MILLER 2,629,401

MAGNETICALLY CONTROLLED PACKLESS VALVE

Filed Oct. 8, 1947

INVENTOR.
Wesley G. Miller
BY
Florian L. Miller,
Atty.

Patented Feb. 24, 1953

2,629,401

UNITED STATES PATENT OFFICE 2,629,401

MAGNETICALLY CONTROLLED PACKLESS VALVE

Wesley G. Miller, Erie, Pa., assignor to Hays Manufacturing Company, Erie, Pa., a corporation of Pennsylvania Application October 8, 1947, Serial No. 778,688

2 Claims. (Cl. 137—657)

This invention relates generally to valves and more particularly to magnetically controlled valves utilized in a fluid line to pass a predetermined amount of fluid.

Self-closing valves heretofore made and marketed are quite complicated and heavy in construction and require direct manual operations through appropriate levers, hand wheels, or the like. These prior self-closing valves permit shock and hammer in the valve and lines connected thereto in the closing of the valves which results in breakage of pipes, loosening of scale, corrosion, rust and the like in the pipes whereby the released deleterious matter gets into the valves and other portions of the pipe line to cause breakdown, leakage, and generally inefficient operation. The principal difficulty in prior self-closing valves has been the control of the amount of fluid passing through the valve and heretofore control has not been accurate and the amount of fluid passing through a valve in a given length of time has varied over wide limits.

It is, accordingly, an object of my invention to overcome the above and other defects in self-closing valves and it is more particularly an object of my invention to provide a magnetically controlled self-closing valve which is simple in construction, economical in cost, economical in manufacture, light in weight, and positive in operation.

Another object of my invention is to provide a magnetically controlled self-closing valve wherein shock and hammer is eliminated.

Another object of my invention is to provide a magnetically controlled self-closing valve in which a comparatively small single unit piston and guide member may be utilized.

Another object of my invention is to provide a self-closing valve magnetically operated in which size and weight is greatly reduced, a minimum number of parts are required, means are provided for cutting off the flow of fluid upon closing of the valve in a graduated manner without shock or hammer in the supply line, and one which is packless and springless and self-cleaning.

Another object of my invention is to provide a magnetically controlled self-closing valve in which molecular attraction of a liquid is utilized in controlling a piston therein.

Another object of my invention is to provide a permanent magnet for controlling the operation of a self-closing valve.

Another object of my invention is to provide a permanent magnet for use in operating a plunger in a self-closing valve.

Another object of my invention is to provide a magnetically controlled self-closing valve in which the piston therein moves with the pressure to close the port therein.

Another object of my invention is to provide a piston and guide therefor in a self-closing valve having critical clearances to control the opening and closing of the flow port in the valve.

Figure 2:
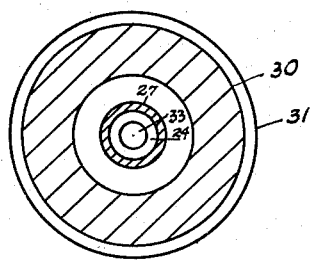

Other objects of my invention will become evident from the following detailed description, taken in conjunction with the accompanying drawings, in which:

Fig. 1 is a vertical sectional view of an illustration of an embodiment of my novel magnetically controlled self-closing valve; and Fig. 2 is a view taken on the line 2—2 of Fig. 1.

Referring now to the drawings, Figs. 1 and 2 show a cylindrically shaped body member 1 having laterally extending inlet and outlet ports 2 and 3 and a laterally extending inner partition 4 having a centrally disposed aperture or port 5 between the inlet 2 and outlet 3 of valve body 1. An enlarged threaded portion 6 is provided on the upper part of the valve body 1 and has seated thereon a flanged cap member 7 secured by a threaded locking member 8 threadably engaging the threaded portion 6 of the body member 1. The cap member 7 has a bevelled seating portion 9 for engaging a corresponding bevelled seating portion 10 on the upper end of the valve body 1 to provide metal to metal sealing contact. A piston 11, having reduced stepped portions 12 and 13, reciprocates in the body member 1 and has a cylindrical guiding portion 14 with an inverted V-shaped slot 15 which extends through the port 5 in the partition 4 to guide the lower end of the piston 11. A marginal beaded seating portion 16 is formed around the port 5 and engages a bonded rubber seat 17 on the lower end 18 of the piston 11. The piston 11 has a centrally disposed orifice 20 with a tapered countersunk seat 21 leading into an enlarged orifice 22 in the lower portion of the piston 11. The tapered countersunk seat 21 is preferably countersunk with two different angular portions to permit greater flow of fluid and with a bonded rubber surface 23. A reciprocable plunger 24 has a tapered seating portion 25 for engaging the tapered seat 21 in the piston 11. The plunger 24 reciprocates in a sleeve 27 having a threaded portion 28 which threadably engages threaded flanged portion 29 on the cap member 7. An annular shaped permanent magnet 30 having guiding washers 31 on the ends thereof is spaced from and disposed around the sleeve 27 and moves longitudinally thereof. The strength of the magnet 30 is such that the armature or plunger 24 will move with the magnet 30 in either direction upon longitudinal movement of the magnet 30. The magnet 30 may be provided with any suitable guiding means for guiding it along the sleeve 27 and any other suitable leverage or other means may be utilized in its movement.

The upper end of the armature or plunger 24 has a tapered projecting end 33 for engaging a tapered seating portion 34 in the end of an adjusting screw 35. The adjusting screw 35 is disposed in an aperture 36 of a threaded member 37 and has an enlarged threaded portion 38 for engaging the internal threads 39 on the upper end of the sleeve 27. The member 37 has internal threads 40 for threadably engaging the threaded portion 41 on the upper end of the sleeve 27. A suitable washer 42 and gland member 43 are disposed in a threaded recess 44 in the upper end of the member 37. Adjusting screw 35 has a cross slot 45 for engagement by a screw driver or any other suitable tool. A threaded cap member 46 is threadably engaged with the outer threaded portion 47 of the member 37 to protect and cover the outer end of the adjusting screw 35.

In operation, the magnet 30 assumes a balanced position preferably spaced from the cap member 7 as shown in Figure 1 of the drawing. When it is desired to move the plunger 24 upwardly, the magnet 30 is moved longitudinally of the sleeve 27 wherein the plunger 24 will follow it. When the plunger 24 is moved upwardly, liquid passes from the chamber above the head of the piston 11 through the control orifices 20 thereby causing the pressure in the chamber above the piston 11 to decrease materially below the pressure in the supply line. Because of this decrease in pressure in the upper portion of the body member 1, the piston 11 rises, thereby moving the seat 17 away from the seat 16. Inverted V-shaped ports 15 in the guide portion 14 of the piston member 11 permits the liquid to increase its flow gradually from the inlet 2 to the outlet 3 until the piston 11 is raised to the upper end of the body member 1 wherein full flow of the liquid takes place through the flow port 5 of the partition 4. In closing the valve, the magnet 30 is moved towards the cap member 7 wherein the armature 26 will follow it and the tapered end 25 of the plunger 24 will sealingly engage the tapered seat 21 of the piston 11. The flow of fluid through the control orifice 20 is thereby stopped and liquid will than pass upwardly into the chamber above the piston 10 between the outer portion of the piston 11 and the inner side wall of the body member 1. It has been found that when the clearance between the piston 11 and the side wall of the body member 1 is from .001 to .003 of an inch, the liquid will pass to the chamber above the piston 11 gradually thereby moving the piston 11 downwardly in a slow and easy manner and closing the port 5 gradually. As the piston member 11 moves downwardly, the inverted V-shaped slots 15 in the guiding portion 14 of the piston member 11 gradually tapers off the flow from the inlet 2 to the outlet 3 of the body member 1 until the seat 17 sealingly engages the seating portion 16 and completely closes the port 5 to the flow of fluid. The gradual tapering off or cutting off of the flow of fluid through the port 5 prevents shock and hammer and resultant noises in the supply lines, and it is so evenly graduated or tapered off that the closing of the valve sets up no vibrations in the valve or supply lines. The clearance between the outer side of the guide portion 14 and the inner side of the port 5 has been found to be preferably from .001 to .003 of an inch for the most efficient operation to prevent too great of a flow of fluid between the outer side of the guide portion 14 of the piston 11 and the port 5. The small clearances in my novel valve filters out all dirt and other deleterious matter which might pass to the chamber above the piston 11 so that the control orifice 20 will not be clogged up by any solid matter passing therethrough. By providing a tapered seat 21 on the upper head portion of the piston member 11 and a tapered seating portion 25 on the plunger 24, these surfaces will tend to be held apart by the film of liquid flowing therebetween and in this manner I utilize an adjustable limiting member 35 to limit the movement of the plunger 23 to predetermine the amount of movement of the piston 11 and the amount of liquid passing from the inlet 2 to the outlet 3 of the body member 1. Adjustable member 35 may be adjusted longitudinally by means of a screw driver. By providing a tapered seat 21 in the head of the piston 11, tapered seating portion 25 of the plunger 24 will always be in alignment with the control orifice 20 in the piston 11.

All parts of my valve are small because the piston closes with the pressure and there is no snap action closing.

My novel magnet 30 is spaced from the sleeve 27 so that maximum magnetic forces with opposite poles are formed on the opposite ends of the magnet 30 and passes to and controls the plunger 24 through magnetic forces which move in somewhat of a rotating field. By spacing my annular member from the sleeve 27, I obtain considerably greater magnetic force from a given size magnet.

It will thus be seen that I provide simple means for controlling a self-closing valve of the type described externally of the valve end within any specified limits thereby permitting better control of fluid through the valve and providing a valve which is economical to maintain and which has a minimum of wearing parts. I further provide modulation in a packless valve in that it may be opened ½, ¾ or any other open position by moving the magnet longitudinally. My novel valve operates under water and in any angular position in that the operation of the plunger depends on the magnetic flux of the magnet and not on gravity, to hold the plunger in sealing engagement with the seat on the piston.

Various changes may be made in the specific embodiment of my invention without departing from the spirit thereof or from the scope of the appended claims.

What I claim is:

1. In combination, a valve, a magnetic operating means for said valve, said valve comprising a hollow cylindrical body having an enlarged portion at one side thereof, a partition in said cylindrical body having an opening therein, a piston having an orifice, said piston disposed in said enlarged portion, and a projection on said piston adapted to project through said opening, said projection having a transverse V-shaped slot, said slot communicating with said orifice whereby fluid may flow through said orifice and slot and through said opening, thereby controlling the rate of closing of said valve.

2. The valve recited in claim 1 wherein the magnetic operating means comprises a plunger, said plunger having an end portion comprising a seating portion adapted to engage a complementary seating portion on said piston to control the flow of fluid through said orifice to control the movement of said piston whereby the flow of fluid through said opening is controlled.

WESLEY G. MILLER.

REFERENCES CITED

The following references are of record in the file of this patent:

UNITED STATES PATENTS

| Number | Name | Date |
|---|---|---|
| 732,851 | Hanchett | July 7, 1903 |
| 1,245,194 | Crabbe | Nov. 6, 1917 |
| 1,389,056 | Lane | Aug. 30, 1921 |
| 1,807,191 | Boyle | May 26, 1931 |
| 2,249,160 | Mott | July 15, 1941 |
| 2,269,484 | Ronay | Jan. 13, 1942 |
| 2,285,323 | Beekley | June 2, 1942 |
| 2,307,723 | Anderson | Jan. 5, 1943 |
| 2,350,905 | Koehler | June 6, 1944 |
| 2,371,511 | Faus | Mar. 13, 1945 |
| 2,405,127 | Beach | Aug. 6, 1946 |